(12) United States Patent
Ko et al.

(10) Patent No.: US 8,548,006 B2
(45) Date of Patent: Oct. 1, 2013

(54) DATA TRANSMISSION METHOD USING STBC SCHEME

(75) Inventors: Hyun Soo Ko, Gyeongki-do (KR); Moon Il Lee, Gyeongki-do (KR); Jea Hoon Chung, Gyeongki-do (KR); Seung Hee Han, Gyeongki-do (KR); Yeong Hyeon Kwon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/000,470

(22) PCT Filed: Jun. 5, 2009

(86) PCT No.: PCT/KR2009/003012
§ 371 (c)(1),
(2), (4) Date: Dec. 21, 2010

(87) PCT Pub. No.: WO2009/157658
PCT Pub. Date: Dec. 30, 2009

(65) Prior Publication Data
US 2011/0142076 A1   Jun. 16, 2011

Related U.S. Application Data

(60) Provisional application No. 61/075,754, filed on Jun. 26, 2008, provisional application No. 61/081,377, filed on Jul. 16, 2008, provisional application No. 61/087,975, filed on Aug. 11, 2008, provisional application No. 61/088,353, filed on Aug. 13, 2008, provisional application No. 61/155,131, filed on Feb. 24, 2009.

(30) Foreign Application Priority Data
May 29, 2009   (KR) ................. 10-2009-0047224

(51) Int. Cl.
H04J 1/00   (2006.01)
(52) U.S. Cl.
USPC ............................................. 370/480
(58) Field of Classification Search
USPC .................. 370/480, 281, 295, 302, 343
See application file for complete search history.

(56) References Cited

U.S. PATENT DOCUMENTS 6,888,809 B1   5/2005   Foschini et al.
7,881,247 B2   2/2011   Pan et al.
(Continued)

FOREIGN PATENT DOCUMENTS

KR   10-2001-0076252   8/2001
KR   2005-0069802   7/2005
(Continued)

OTHER PUBLICATIONS

U.S. Appl. No. 61/074,399, filed Jun. 20, 2008.*
(Continued)

*Primary Examiner* — Jared Fureman
*Assistant Examiner* — Aqeel Bukhari
(74) *Attorney, Agent, or Firm* — Morgan, Lewis & Bockius LLP

(57) ABSTRACT

A data transmission method using a space time block code (STBC) scheme is provided. The method includes generating a modulation symbol by performing coding and constellation mapping on an information bit, generating a frequency-domain symbol by performing discrete Fourier transform (DFT) on the modulation symbol, generating a single carrier-frequency division multiple access (SC-FDMA) symbol by performing inverse fast Fourier transform (IFFT) after mapping the frequency-domain symbol to a subcarrier, and transmitting the SC-FDMA symbol on a slot basis.

1 Claim, 20 Drawing Sheets

(56) References Cited

U.S. PATENT DOCUMENTS

| | | |
|---|---|---|
| 8,068,555 B2 | 11/2011 | Jongen et al. |
| 8,095,143 B2 | 1/2012 | Amirijoo et al. |
| 2003/0139139 A1 | 7/2003 | Onggosanuisi et al. |
| 2004/0077378 A1 | 4/2004 | Kim et al. |
| 2005/0265280 A1 | 12/2005 | Roh et al. |
| 2006/0067421 A1 | 3/2006 | Walton et al. |
| 2007/0004465 A1 | 1/2007 | Papasakellariou et al. |
| 2007/0115795 A1 | 5/2007 | Gore et al. |
| 2007/0189151 A1 | 8/2007 | Pan et al. |
| 2007/0211822 A1 | 9/2007 | Olesen et al. |
| 2008/0032746 A1 | 2/2008 | Olesen et al. |
| 2008/0056117 A1 | 3/2008 | Muharemovic et al. |
| 2008/0080472 A1* | 4/2008 | Bertrand et al. .............. 370/344 |
| 2008/0080637 A1 | 4/2008 | Khan et al. |
| 2008/0089441 A1 | 4/2008 | Hwang et al. |
| 2008/0095252 A1 | 4/2008 | Kim |
| 2008/0117999 A1 | 5/2008 | Kadous et al. |
| 2008/0165891 A1 | 7/2008 | Budianu |
| 2008/0279170 A1 | 11/2008 | Malladi et al. |
| 2008/0307427 A1 | 12/2008 | Pi et al. |
| 2009/0073922 A1* | 3/2009 | Malladi et al. ................ 370/328 |
| 2009/0202016 A1* | 8/2009 | Seong et al. ................... 375/267 |
| 2009/0279447 A1* | 11/2009 | Mehta et al. ................... 370/252 |
| 2010/0091903 A1 | 4/2010 | Castelain et al. |
| 2010/0091919 A1 | 4/2010 | Xu et al. |
| 2010/0111209 A1 | 5/2010 | Frenger |
| 2011/0228728 A1 | 9/2011 | Baligh |

FOREIGN PATENT DOCUMENTS

| | | |
|---|---|---|
| KR | 2006-0048106 | 5/2006 |
| KR | 10-0698199 B | 3/2007 |
| KR | 10-0785806 B | 12/2007 |
| KR | 2008-0025260 | 3/2008 |
| KR | 10-0899735 B | 5/2009 |
| WO | 03/085876 | 10/2003 |

OTHER PUBLICATIONS

C. Ciochina et al., "Single-Carrier Space-Frequency Block Coding Performance Evaluation", IEEE 66th Vehicular Technology Conference, 2007, pp. 715-719.
International Search Report from PCT/KR2009/003487.
International Search Report from PCT/KR2009/003466.
International Search Report from PCT/KR2009/003026.
International Search Report from PCT/KR2009/003012.
International Search Report from PCT/KR2009/003027.
International Search Report from related technology PCT Application No. PCT/KR2009/003037.
C. Ciochina et al., "Single-Carrier Space-Frequency Block Coding Performance Evaluation", IEEE Vehicular Technology Conference, 2007, pp. 715-719.
Office Action issued by the U.S. Patent & Trademark Office on Feb. 8, 2013 in U.S. Appl. No. 13/000,546.
Office Action issued by the U.S. Patent & Trademark Office on Feb. 15, 2013 in U.S. Appl. No. 13/001,219.
USPTO—Office Action for U.S. Appl. No. 13/000,706—Issued on Mar. 20, 2013.
Notice of Allowance mailed from the USPTO on Nov. 15, 2012 for the corresponding U.S. Appl. No. 13/058,488.
U.S. Office Action for U.S. Appl. No. 13/000,958 dated Oct. 18, 2012.
U.S. Office Action for U.S. Appl. No. 13/001,219 dated Oct. 25, 2012.

* cited by examiner

DATA TRANSMISSION METHOD USING STBC SCHEME

The present application is a national stage of PCT International Application No. PCT/KR2009/003012, filed Jun. 5, 2009, and claims the benefit of U.S. Provisional Application Nos. 61/075,754, filed Jun. 26, 2008, 61/081,377, filed Jul. 16, 2008, 61/087,975, filed Aug. 11, 2008, 61/088,353, filed Aug. 13, 2008, and 61/155,131, filed Feb. 24, 2009. The present national stage application also claims the benefit of Korean Patent Application No. 10-2009-0047224, filed May 29, 2009.

BACKGROUND

1. Technical Field

The present invention relates to wireless communication systems, and more particularly, to a data transmission method providing a transmit diversity based on a space time block code (STBC) scheme in a single carrier-frequency division multiple access (SC-FDMA) or orthogonal frequency division multiplexing (OFDM) system.

2. Related Art

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data rate of a wireless system, which results in motivating massive researches.

A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission through a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system. The MIMO system is also referred to as a multiple antenna system.

Exemplary schemes for diversity implementation in the MIMO system include space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc.

Meanwhile, an orthogonal frequency division multiplexing (OFDM) system capable of reducing inter-symbol interference with a low complexity is taken into consideration as one of post-$3^{rd}$ generation wireless communication systems. In the OFDM, a serially input data symbol is converted into N parallel data symbols, and is then transmitted by being carried on N orthogonal subcarriers. The subcarriers maintain orthogonality in a frequency dimension. An orthogonal frequency division multiple access (OFDMA) is a multiple access scheme for achieving multiple access by independently providing some of available subcarriers to each user in a system using the OFDM as a modulation scheme.

One of main problems of the OFDM/OFDMA system is that a peak-to-average power ratio (PAPR) can be significantly large. The PAPR problem occurs when a peak amplitude of a Tx signal is significantly larger than an average amplitude. Further, the PAPR problem is caused by a fact that an OFDM symbol is an overlap of N sinusoidal signals on different subcarriers. The PAPR is particularly problematic in a UE sensitive to power consumption in association with battery capacity. Single carrier-frequency division multiple access (SC-FDMA) is proposed to decrease the PAPR. The SC-FDMA is frequency division multiple access (FDMA) combined with single carrier-frequency division equalization (SC-FDE). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR.

Signals generated by using the SC-FDMA (or OFDM) scheme are referred to as SC-FDMA symbols (or OFDM symbols). The SC-FDMA symbols are used to carry not only user data but also control signals such as acknowledgement (ACK)/negative acknowledgement (NACK), a rank, channel quality information (CQI), a precoding matrix indicator (PMI), and a reference signal which is a signal used to determine a channel state. The reference signal is used for effective channel estimation. A demodulation reference signal (DMRS) is a reference signal used for data restoration by estimating a downlink channel. A sounding reference signal (SRS) is a reference signal used to estimate an uplink channel. Channel estimation capability of the SC-FDMA symbol is closely related to a position of the DMRS. That is, the closer the distance of the SC-FDMA symbol to the DMRS, the less the error of data modulation capability.

Meanwhile, when applying such an SC-FDMA scheme, a single-carrier property has to be satisfied. In particular, in case of applying the STBC, the single-carrier property can be satisfied only when the SC-FDMA symbols are paired in an even number. However, since the reference signal is transmitted on the SC-FDMA symbol by using all subcarriers belonging to one resource block, the reference signal is excluded in an SC-FDMA symbol pair for the STBC. As described above, since the channel estimation capability of the SC-FDMA symbol is closely related to the position of the DMRS, the SC-FDMA symbol pair needs to be effectively made for reliable transmission. Accordingly, there is a need for a data transmission method providing a transmit diversity by using an STBC scheme in an SC-FDMA or OFDM system.

SUMMARY

The present invention provides a data transmission method using a space time block code (STBC) scheme.

According to an aspect of the present invention, a data transmission method using a space time block code (STBC) scheme is provided. The method includes generating a modulation symbol by performing coding and constellation mapping on an information bit, generating a frequency-domain symbol by performing discrete Fourier transform (DFT) on the modulation symbol, generating a single carrier-frequency division multiple access (SC-FDMA) symbol by performing inverse fast Fourier transform (IFFT) after mapping the frequency-domain symbol to a subcarrier, and transmitting the SC-FDMA symbol on a slot basis.

According to the present invention, a space time block code (STBC) scheme is effectively applied in a single carrier-frequency division multiple access (SC-FDMA) or orthogonal frequency division multiplexing (OFDM) system. Therefore, a peak-to-average power ratio (PAPR) can be decreased and higher robustness of data transmission can be achieved.

DESCRIPTION OF EXEMPLARY EMBODIMENTS

Figure 1:
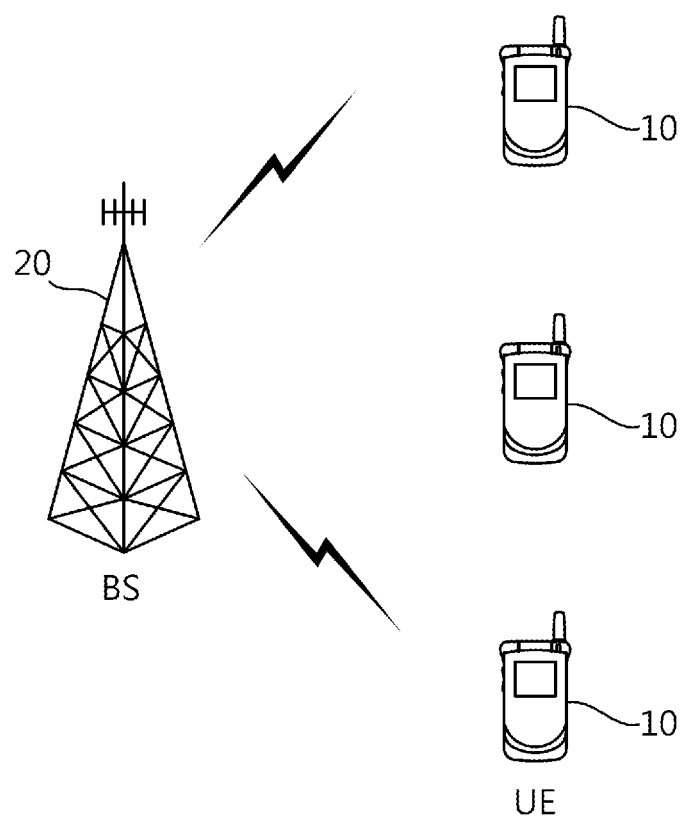
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and may also be referred to as a forward link. An uplink (UL) denotes a communication link from the UE to the BS, and may also be referred to as a reverse link. In the DL, a transmitter may be a part of the BS, and a receiver may be a part of the UE. In the UL, the transmitter may be a part of the UE, and the receiver may be a part of the BS.

There is no restriction on multiple access schemes used in the wireless communication system. In addition to well-known modulation schemes, various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc. These modulation schemes can increase system capacity by demodulating signals received from multiple users of the communication system.

DL transmission and UL transmission may use different multiple access schemes. For example, DL transmission may use OFDMA, and UL transmission may use SC-FDMA or clustered discrete Fourier transform spread orthogonal frequency division multiplexing (DFT-S-OFDM). A typical SC-FDMA scheme implies that DFT-spread symbol streams are allocated (or mapped) to consecutive subcarriers or equally-spaced subcarriers. The clustered DFT-S-OFDM allocates (or maps) M(<N) symbol streams among N symbol streams which are DFT spread, and allocates (or maps) the remaining N-M symbol-streams to consecutive subcarriers spaced apart by a specific interval from a subcarrier on which the M symbol streams are allocated (or mapped). Advantageously, frequency selective scheduling can be performed when using the clustered DFT-S-OFDM.

Figure 2:
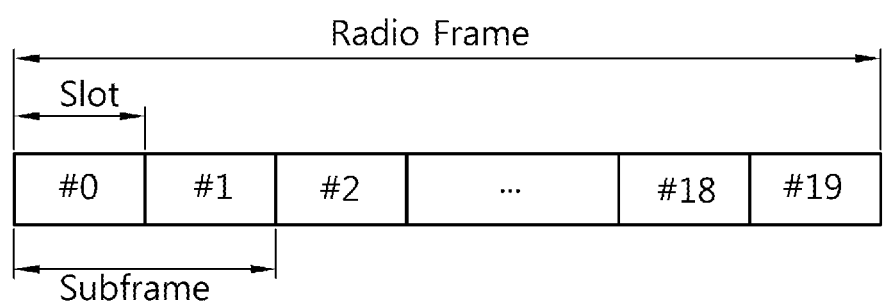
FIG. 2 shows an example of a radio frame structure.

FIG. 2 shows an example of a radio frame structure.

Referring to FIG. 2, a radio frame consists of 10 subframes. One subframe may include two slots. One slot may include a plurality of SC-FDMA symbols (or OFDM symbols) in a time domain and at least one subcarrier in a frequency domain. The slot may be a unit of allocating radio resources in the time domain and the frequency domain.

The number of SC-FDMA symbols included in one slot may vary according to configuration of a cyclic prefix (CP). The CP is classified into an extended CP and a normal CP. For example, if the SC-FDMA symbols are configured by the normal CP, the number of SC-FDMA symbols included in one slot may be 7. If the SC-FDMA symbols are configured by the extended CP, a length of one SC-FDMA symbol is decreased, and thus the number of SC-FDMA symbols included in one slot is less than that of the case of using the normal CP. For example, the number of SC-FDMA symbols included in one slot may be 6. In a case where a channel condition is unstable, for example, when a UE moves in a fast speed, the extended CP may be used to further decrease inter-symbol interference or may be used to provide a multimedia broadcast multicast service (MBMS).

The structure of the radio frame is for exemplary purposes only, and thus the number of subframes included in the radio frame, the number of slots included in the subframe, and the number of SC-FDMA symbols included in the slot may also change variously.

Figure 3:
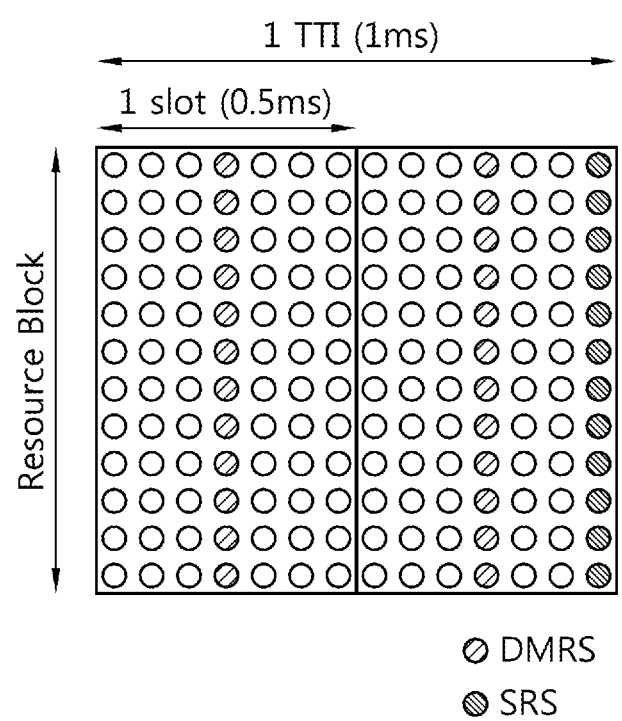
FIG. 3 shows an example of a subframe.

FIG. 3 shows an example of a subframe.

Referring to FIG. 3, the subframe includes two slots. Since an SC-FDMA symbol is configured with a normal CP, one slot includes 7 SC-FDMA symbols in a time domain. Therefore, one subframe includes 14 SC-FDMA symbols in total. Meanwhile, one slot includes a plurality of resource blocks (RBs) in a frequency domain. A unit consisting of one SC- FDMA symbol and one subcarrier is referred to as a resource element. When one RB includes 12 subcarriers, one RB includes 12×7 resource elements. One SC-FDMA symbol in each slot is allocated for transmission of a demodulation reference signal (DMRS) used for data demodulation. The remaining SC-FDMA symbols are allocated for transmission of data or control signals, and thus 12 SC-FDMA symbols in total are allocated for transmission of data or control signals within one subframe. If a sounding reference signal (SRS) for uplink channel estimation is transmitted on one SC-FDMA symbol in addition to the DMRS, 11 SC-FDMA symbols in total are allocated for data transmission within one subframe. The SRS can be transmitted on a last SC-FDMA symbol of a $2^{nd}$ slot.

The structure of the subframe is for exemplary purposes only. Thus, the number of slots included in the subframe, the number of SC-FDMA symbols included in the slot, the number of DMRSs, and a position of the SC-FDMA symbol allocated to the DMRS and the SRS may change variously.

Figure 4:
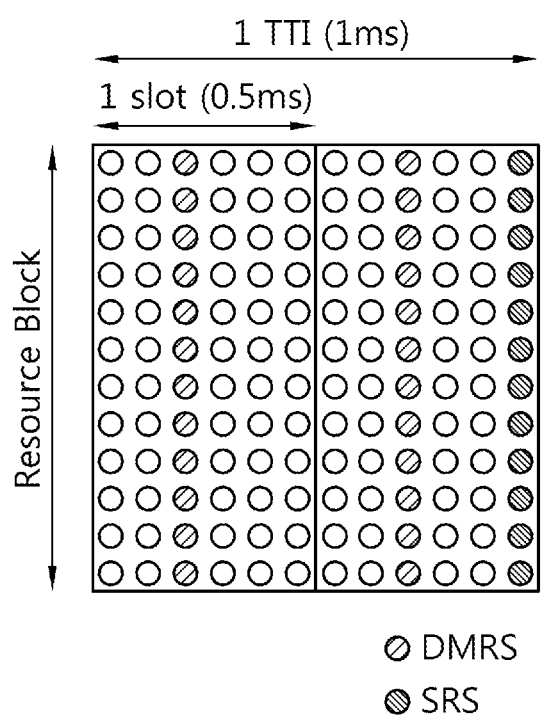
FIG. 4 shows another example of a subframe.

FIG. 4 shows another example of a subframe.

Referring to FIG. 4, unlike the subframe structure of FIG. 3, an SC-FDMA symbol is configured with an extended CP, thus one slot includes 6 SC-FDMA symbols in a time domain. Therefore, one subframe includes 12 SC-FDMA symbols in total. One subframe is 1 transmission time interval (TTI), where 1 TTI is 1 millisecond (ms). Each slot has a length of 0.5 ms. In each slot, one SC-FDMA symbol is allocated for transmission of a DMRS. The remaining SC-FDMA symbols are allocated for transmission of data or control signals, and thus 10 SC-FDMA symbols in total are allocated for transmission of data or control signals within one subframe. If an SRS for uplink channel estimation is transmitted on one SC-FDMA symbol in addition to the DMRS, 9 SC-FDMA symbols in total are allocated for transmission of data or control signals within one subframe. The SRS can be transmitted on a last SC-FDMA symbol of a $2^{nd}$ slot. The structure of the subframe is for exemplary purposes only. Thus, the number of slots included in the subframe, the number of SC-FDMA symbols included in the slot, and a position of the SC-FDMA symbol on which the DMRS is transmitted may change variously.

Figure 5:
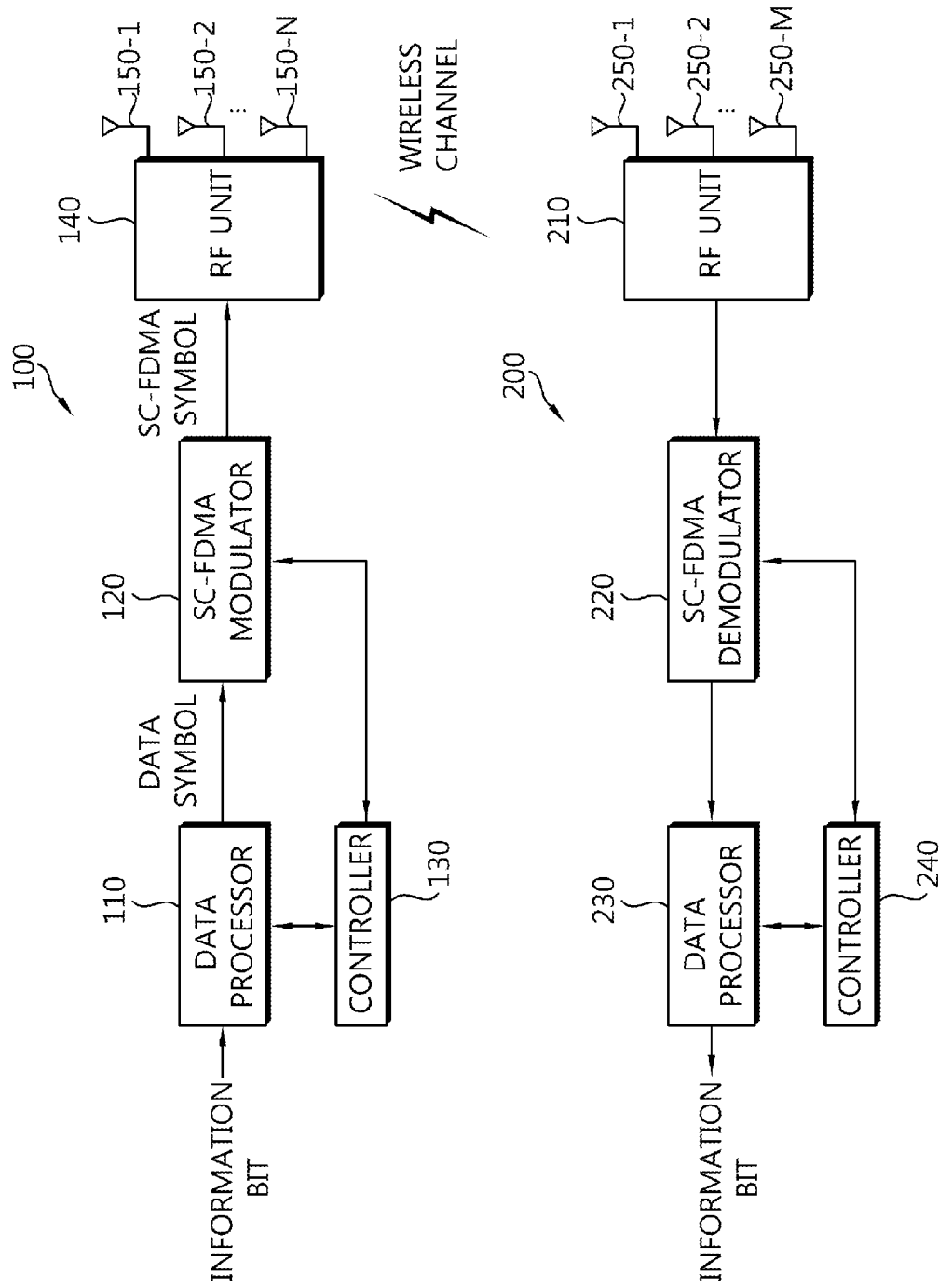
FIG. 5 is a diagram for explaining a wireless communication system using an STBC scheme.

FIG. 5 is a diagram for explaining a wireless communication system using an STBC scheme. In an STBC, a signal is split and transmitted in time and space domains, and signals received for respective antennas are determined by a maximum likelihood combining scheme.

Referring to FIG. 5, the wireless communication system using the STBC includes a transmitter 100 and a receiver 200. The transmitter 100 includes a data processor 110, an SC-FDMA modulator 120, a controller 130, a radio frequency (RF) unit 140, and Tx antennas 150-1, 150-2, . . . , 150-N.

The data processor 110 performs channel coding on an input information bit to generate a codeword, and performs constellation mapping on the codeword to generate a modulation symbol. The information bit includes user plane information to be transmitted to the receiver 200. Further, the information bit may include control plane information in association with transmission of the user plane information or radio resource allocation.

The SC-FDMA modulator 120 performs the STBC operation on a time-domain data symbol to generate an STBC, and performs modulation using an SC-FDMA modulation scheme to generate an SC-FDMA symbol. The control plane information may be input to the SC-FDMA modulator 120 after being modulated independently from the user plane information. The controller 130 controls operations of the data processor 110 and the SC-FDMA modulator 120. The RF unit 140 converts an input SC-FDMA symbol into an analog signal. The converted analog signal is propagated to a wireless channel through the Tx antennas 150-1, 150-2, . . . , 150-N.

The receiver 200 includes an RF unit 210, an SC-FDMA demodulator 220, a data processor 230, a controller 240, and Rx antennas 250-1, 250-2, . . . , 250-M.

The RF unit 210 converts signals received through the Rx antennas 250-1, 250-2, . . . , 250-M into digital signals. The SC-FDMA demodulator 220 outputs a data symbol by performing a counterpart operation of the modulation performed by the SC-FDMA modulator 120. The data processor 230 recovers an information bit from the data symbol. The controller 240 controls operations of the SC-FDMA demodulator 220 and the data processor 230.

Figure 6:
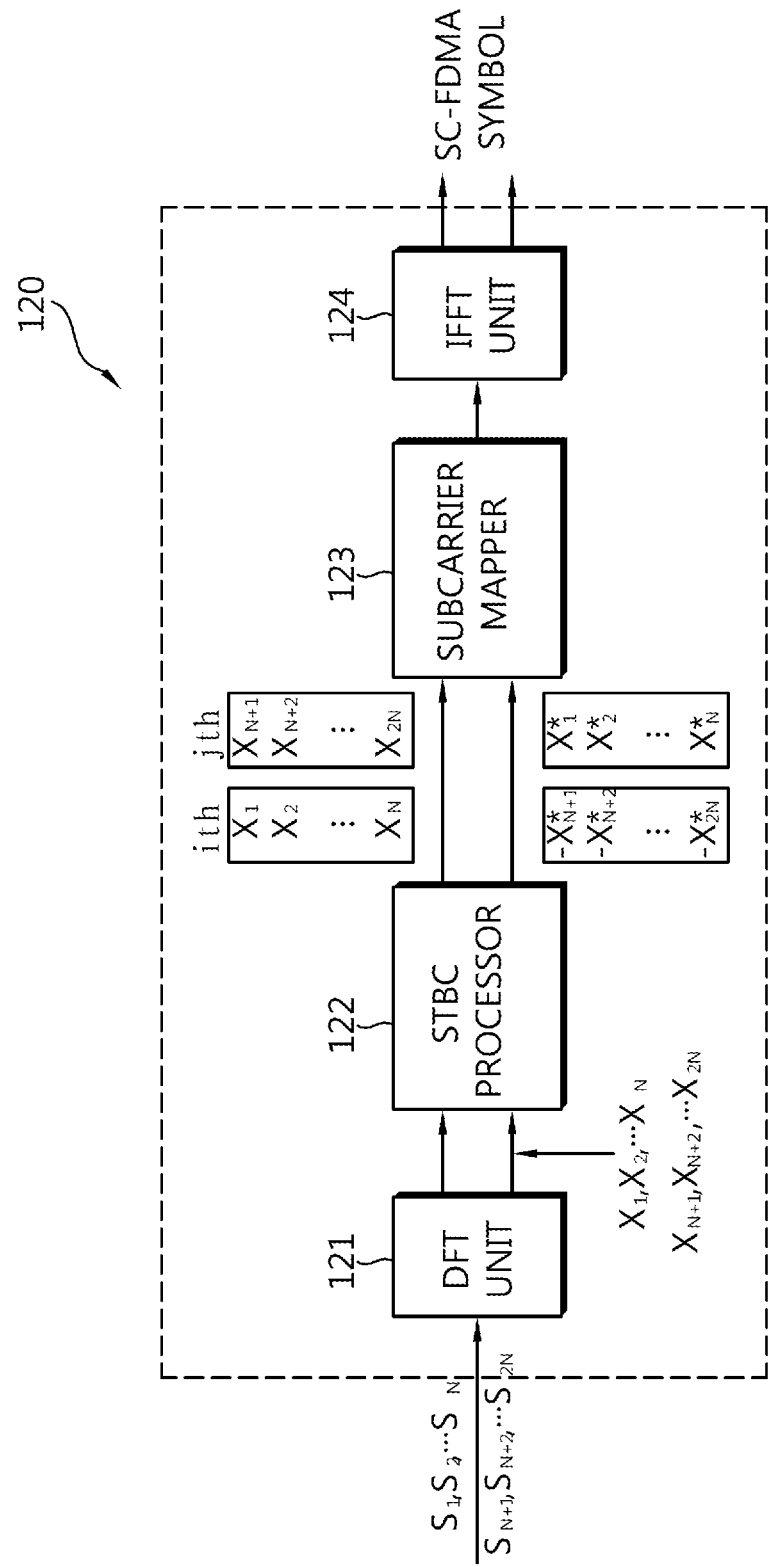
FIG. 6 is a block diagram showing an example of an SC-FDMA modulator.

FIG. 6 is a block diagram showing an example of an SC-FDMA modulator. An STBC scheme is applied to the SC-FDMA modulator. It is assumed herein that the number of Tx antennas is 2.

Referring to FIG. 6, an SC-FDMA modulator 120 includes a discrete Fourier transform (DFT) unit 121 for performing DFT, an STBC processor 122, a subcarrier mapper 123, and an inverse fast Fourier transform (IFFT) unit 124 for performing IFFT.

The DFT unit 121 performs DFT on 2N time-domain data symbol streams $S_1, S_2, \ldots, S_N, S_{N+1}, \ldots, S_{2N}$ to output frequency-domain symbol streams $X_1, X_2, \ldots, X_N, X_{N+1}, \ldots, X_{2N}$. If a DFT size is N, DFT spreading is performed for N data symbol streams simultaneously. The DFT size may be fixed to a size of assigned resource blocks, or may vary depending on systems.

The STBC processor 122 blocks the frequency-domain symbol streams $X_1, X_2, \ldots, X_N, X_{x+1}, \ldots, X_{2N}$ for each antenna and for each time according to the STBC scheme to generate STBCs [$(X_1, X_2, \ldots, X_N)$ $(-X^*_{N+1}, -X^*_{N+2}, \ldots, -X^*_{2N})$ $(X_{N+1}, X_{N+2}, \ldots, X_{2N})$, $(X^*_1, X^*_2, \ldots, X^*_N)$]. $1^{st}$ STBC streams $(X_1, X_2, \ldots, X_N)$ and $(-X^*_1, -X^*_{N+2}, \ldots, -X^*_{2N})$ correspond to subcarriers of an $i^{th}$ SC-FDMA symbol. $2^{nd}$ STBC streams $(X_{N+1}, X_{N+2}, \ldots, X_{2N})$ and $(X^*_1, X^*_2, \ldots, X^*_N)$ correspond to subcarriers of a $j^{th}$ SC-FDMA symbol. An STBC provided by the STBC processor 122 is defined by a transport matrix G having a size of $p \times n_T$. Herein, p denotes a length of the STBC, and $n_T$ denotes the number of Tx antennas. G is generated by linear combination of symbols $x_1, x_2, \ldots, x_p$ and their complex conjugate numbers. Different codewords are simultaneously transmitted to respective Tx antennas. If an STBC length is 2 and an STBC system has two Tx antennas, the transport matrix G is expressed by Equation 1 below.

$$G = \begin{bmatrix} x_1 & x_2 \\ -x_2^* & x_1^* \end{bmatrix}$$ [Equation 1]

or $$G = \begin{bmatrix} x_1 & -x_2^* \\ x_2 & x_1^* \end{bmatrix}$$

Herein, if $$G = \begin{bmatrix} x_1 & x_2 \\ -x_2^* & x_1^* \end{bmatrix},$$

the STBC streams generated as described above have a mapping relation with respect to the Tx antenna and the SC-FDMA symbol as shown in Table 1 below.

TABLE 1

|  | $i^{th}$ SC-FDMA symbol | $j^{th}$ SC-FDMA symbol |
|---|---|---|
| $1^{st}$ Tx antenna | $X_1, X_2, \ldots, X_N$ | $X_{N+1}, X_{N+2}, \ldots, X_{2N}$ |
| $2^{nd}$ Tx antenna | $-X^*_{N+1}, -X^*_{N+2}, \ldots, -X^*_{2N}$ | $X^*_1, X^*_2, \ldots, X^*_N$ |

Referring to Table 1, the $1^{st}$ STBC streams $(X_1, X_2, \ldots, X_N)$ and $(-X^*_{N+1}, -X^*_{N+2}, \ldots, -X^*_{2N})$ are mapped to the $i^{th}$ SC-FDMA symbol. Among them, $(X_1, X_2, \ldots, X_N)$ is transmitted through a $1^{st}$ Tx antenna, and $(-X^*_{N+1}, -X^*_{N+2}, \ldots, -X^*_{2N})$ is transmitted through a $2^{nd}$ Tx antenna. Further, the $2^{nd}$ STBC streams $(X_{N+1}, X_{N+2}, \ldots, X_{2N})$ and $(X^*_1, X^*_2, \ldots, X^*_N)$ are mapped to the $j^{th}$ SC-FDMA symbol. Among them, $(X_{N+1}, X_{N+2}, \ldots, X_{2N})$ is transmitted through the $1^{st}$ Tx antenna, and $(X^*_1, X^*_2, \ldots, X^*_N)$ is transmitted through the $2^{nd}$ Tx antenna.

The subcarrier mapper 123 maps STBCs $(X_1, X_2, \ldots, X_N)$, $(-X^*_{N+1}, -X^*_{N+2}, \ldots, -X^*_{2N})$, $(X_{N+1}, X_{N+2}, \ldots, X_{2N})$, and $(X^*_1, X^*_2, \ldots, X^*_N)$ respectively to subcarriers allocated according to scheduling information. All of the allocated subcarriers are located in the same frequency bands without being frequency-hopped for each slot. For example, if a plurality of resource blocks are allocated to the transmitter, the respective resource blocks occupy the same frequency bands on consecutive slots. The resource block implies a physical resource including a plurality of subcarriers.

The IFFT unit 124 outputs time-domain SC-FDMA symbols (i.e., SC-FDMA symbols) by performing IFFT on the subcarriers to which the STBCs are mapped. The $i^{th}$ SC-FDMA symbol and the $j^{th}$ SC-FDMA symbol are generated according to a time sequence. Although only one IFFT unit 124 is shown herein, this is for exemplary purposes only. Thus, the number of IFFT units 124 may vary depending on the number of Tx antennas. A scheme for performing modulation by combining DFT and IFFT is referred to as SC-FDMA, and is advantageous over OFDM in terms of decreasing a peak-to-average power ratio (PAPR). This is because the SC-FDMA has a single-carrier property.

In the STBC based on the Tx matrix G, SC-FDMA symbols in the same frequency band are required to make a pair in order to satisfy the single-carrier property. There may be several methods for making a pair of SC-FDMA symbols. To maximize data restoration capability, SC-FDMA symbols need to be paired by considering a position and the number of DMRSs. This is because, the closer the distance of the SC-FDMA symbol to the DMRS, the higher the data restoration success rate. In addition, since the number of SC-FDMA symbols that can be paired in one slot depends on the number of DMRSs, how to transmit non-paired SC-FDMA symbols is also problematic.

Hereinafter, a process of pairing SC-FDMA symbols is referred to as symbol pairing, and an SC-FDMA symbol pair made by the symbol pairing is referred to as a symbol pair. In FIG. 6, a symbol pair is the $i^{th}$ SC-FDMA symbol and the $j^{th}$ SC-FDMA corresponding to the STBCs generated by the STBC processor 122. Hereinafter, the symbol pair of the $i^{th}$ SC-FDMA symbol and the $j^{th}$ SC-FDMA will be expressed by (i, j). Meanwhile, symbol pairing according to the present invention can equally apply to not only a case where frequency is non-hopped between slots but also a case where frequency is hopped between the slots.

Figure 7:
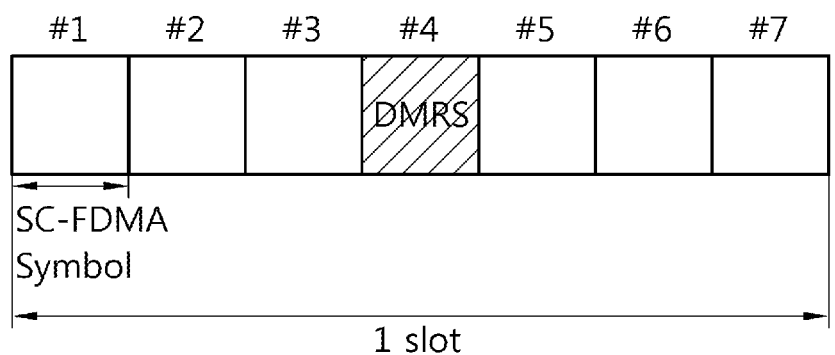
FIG. 7 is a diagram for explaining an example of symbol pairing in a subframe.

FIG. 7 is a diagram for explaining an example of symbol pairing in a subframe.

Referring to FIG. 7, one slot includes 7 SC-FDMA symbols, and a DMRS is transmitted on a $4^{th}$ SC-FDMA symbol. Reliability of data transmission can be increased when symbol pairing is made by using SC-FDMA symbols located near an SC-FDMA symbol for the DMRS. This is because data can be restored by using more improved channel estimation when a distance to the SC-FDMA symbol for the DMRS is shorter. Symbol pairing is not necessarily applied only to contiguous SC-FDMA symbols, and thus various configurations are possible as follows.

TABLE 2

| Index | Symbol Pairing |
|---|---|
| 1 | (1, 2) (3, 5) (6, 7) |
| 2 | (1, 2) (3, 6) (5, 7) |
| 3 | (1, 2) (3, 7) (5, 6) |
| 4 | (1, 3) (2, 5) (6, 7) |
| 5 | (1, 3) (2, 6) (5, 7) |
| 6 | (1, 3) (2, 7) (5, 6) |
| 7 | (1, 5) (2, 6) (3, 7) |
| 8 | (1, 5) (2, 7) (3, 6) |
| 9 | (1, 5) (2, 3) (6, 7) |
| 10 | (1, 6) (2, 3) (5, 7) |
| 11 | (1, 6) (2, 5) (3, 7) |
| 12 | (1, 6) (2, 7) (3, 5) |
| 13 | (1, 7) (2, 3) (5, 6) |
| 14 | (1, 7) (2, 5) (3, 6) |
| 15 | (1, 7) (2, 6) (3, 5) |

Referring to Table 2, symbol pairing of an index 15 is $7^{th}$ configured such that $1^{st}$ and $7^{th}$ SC-FDMA symbols make a $1^{st}$ symbol pair, $2^{nd}$ and $6^{th}$ SC-FDMA symbols make a $2^{nd}$ symbol pair, and $3^{rd}$ and $5^{th}$ SC-FDMA symbols make a $3^{rd}$ symbol pair. If information 1 is transmitted using the $1^{st}$ symbol pair, and information 2 is transmitted using the $2^{nd}$ symbol pair, higher robustness of transmission can be expected. Of course, in this case, the information 1 and the information 2 may be transmitted together, any one of the information 1 and the information 2 may be transmitted, or neither the information 1 nor the information 2 may be transmitted.

Figure 8:
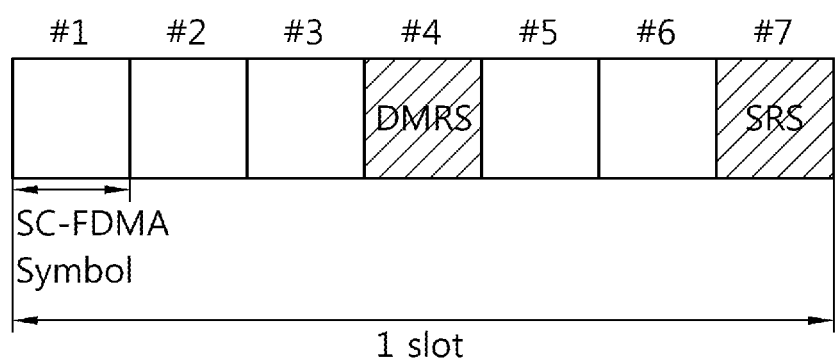
FIG. 8 is a diagram for explaining another example of symbol pairing in a subframe.

FIG. 8 is a diagram for explaining another example of symbol pairing in a subframe.

Referring to FIG. 8, one slot includes 7 SC-FDMA symbols, and a DMRS is transmitted on a $4^{th}$ SC-FDMA symbol. Meanwhile, an SRS is transmitted on a $7^{th}$ SC-FDMA symbol.

Therefore, $1^{st}$, $2^{nd}$, $3^{rd}$, $5^{th}$, and $6^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows.

TABLE 3

| Index | Symbol Pairing |
|---|---|
| 16 | (2, 3) (5, 6) 1 |
| 17 | (2, 5) (3, 6) 1 |
| 18 | (2, 6) (3, 5) 1 |
| 19 | (1, 3) (5, 6) 2 |
| 20 | (1, 5) (3, 6) 2 |
| 21 | (1, 6) (3, 5) 2 |

TABLE 3-continued

| Index | Symbol Pairing |
|---|---|
| 22 | (1, 2) (5, 6) 3 |
| 23 | (1, 5) (2, 6) 3 |
| 24 | (1, 6) (2, 5) 3 |
| 25 | (1, 2) (3, 6) 5 |
| 26 | (1, 3) (2, 6) 5 |
| 27 | (1, 6) (2, 3) 5 |
| 28 | (1, 2) (3, 5) 6 |
| 29 | (1, 3) (2, 5) 6 |
| 30 | (1, 5) (2, 3) 6 |

Referring to Table 3, symbol pairing of an index 18 is configured such that $2^{nd}$ and $6^{th}$ SC-FDMA symbols make a $1^{st}$ symbol pair, and $3^{rd}$ and $5^{th}$ SC-FDMA symbols make a $2^{nd}$ symbol pair, but the remaining one symbol, i.e., a $1^{st}$ SC-FDMA symbol, cannot make any symbol pair. When Tx symbols cannot make a pair in one slot, the single-carrier property cannot be satisfied in the SC-FDMA system, and thus the STBC scheme cannot be applied to the SC-FDMA system. In order to solve this problem, another transmit diversity scheme such as CDD, FSTD, PVS, etc., can be applied to non-paired SC-FDMA symbols. In a case where a spatial diversity gain can be obtained by using the STBC scheme and also frequency hopping is supported to assign resource blocks of different frequency bands, a frequency diversity gain can also be obtained.

Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected. Of course, the information 1 and the information 2 may be transmitted together, either the information 1 or the information 2 may be transmitted, or neither the information nor the information 2 may be transmitted.

Figure 9:
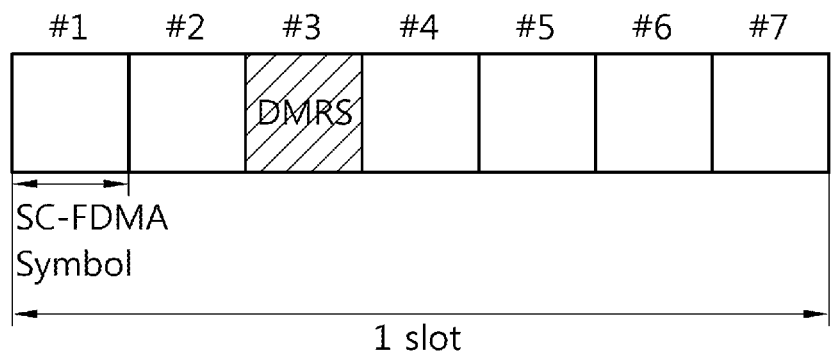
FIG. 9 is a diagram for explaining another example of symbol pairing in a subframe.

FIG. 9 is a diagram for explaining another example of symbol pairing in a subframe.

Referring to FIG. 9, one slot includes 7 SC-FDMA symbols, and a DMRS is transmitted on a $3^{rd}$ SC-FDMA symbol. Reliability of data transmission can be increased when symbol pairing is made by using SC-FDMA symbols located near an SC-FDMA symbol for the DMRS. Symbol pairing is not necessarily applied only to contiguous SC-FDMA symbols, and thus various configurations are possible as follows.

TABLE 4

| Index | Symbol Pairing |
|---|---|
| 31 | (1, 2) (4, 5) (6, 7) |
| 32 | (1, 2) (4, 6) (5, 7) |
| 33 | (1, 2) (4, 7) (5, 6) |
| 34 | (1, 4) (2, 5) (6, 7) |
| 35 | (1, 4) (2, 6) (5, 7) |
| 36 | (1, 4) (2, 7) (5, 6) |
| 37 | (1, 5) (2, 4) (6, 7) |
| 38 | (1, 5) (2, 6) (4, 7) |
| 39 | (1, 5) (2, 7) (4, 6) |
| 40 | (1, 6) (2, 4) (5, 7) |
| 41 | (1, 6) (2, 5) (4, 7) |
| 42 | (1, 6) (2, 7) (4, 5) |
| 43 | (1, 7) (2, 4) (5, 6) |
| 44 | (1, 7) (2, 5) (4, 6) |
| 45 | (1, 7) (2, 6) (4, 5) |

Referring to Table 4, symbol pairing of an index 37 is configured such that $1^{st}$ and $5^{th}$ SC-FDMA symbols make a $1^{st}$ symbol pair, $2^{nd}$ and $4^{th}$ SC-FDMA symbols make a $2^{nd}$ symbol pair, and $6^{th}$ and $7^{th}$ SC-FDMA symbols make a $3^{rd}$ symbol pair. The $1^{st}$ and $2^{nd}$ symbol pairs are made between SC-FDMA symbols spaced apart from each other. The $3^{rd}$ symbol pair is made between contiguous SC-FDMA symbols.

Figure 10:
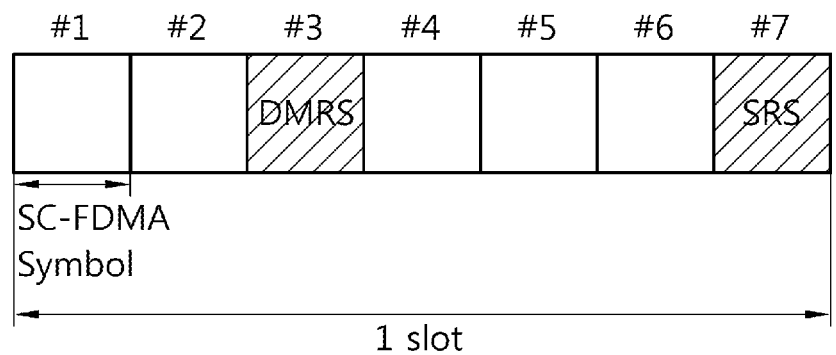
FIG. 10 is a diagram for explaining another example of symbol pairing in a subframe.

FIG. 10 is a diagram for explaining another example of symbol pairing in a subframe.

Referring to FIG. 10, one slot includes 7 SC-FDMA symbols, and a DMRS is transmitted on a $3^{rd}$ SC-FDMA symbol. Meanwhile, an SRS is transmitted on a $7^{th}$ SC-FDMA symbol.

Therefore, $1^{st}$, $2^{nd}$, $4^{th}$, $5^{th}$, and $6^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows.

TABLE 5

| Index | Symbol Pairing |
|---|---|
| 46 | (2, 4) (5, 6) 1 |
| 47 | (2, 5) (4, 6) 1 |
| 48 | (2, 6) (4, 5) 1 |
| 49 | (1, 4) (5, 6) 2 |
| 50 | (1, 5) (4, 6) 2 |
| 51 | (1, 6) (4, 5) 2 |
| 52 | (1, 2) (5, 6) 4 |
| 53 | (1, 5) (2, 6) 4 |
| 54 | (1, 6) (2, 5) 4 |
| 55 | (1, 2) (4, 6) 5 |
| 56 | (1, 4) (2, 6) 5 |
| 57 | (1, 6) (2, 4) 5 |
| 58 | (1, 2) (4, 5) 6 |
| 59 | (1, 4) (2, 5) 6 |
| 60 | (1, 5) (2, 4) 6 |

Referring to Table 5, symbol pairing of an index 60 is configured such that $1^{st}$ and $5^{th}$ SC-FDMA symbols make a $1^{st}$ symbol pair, and $2^{nd}$ and $4^{th}$ SC-FDMA symbols make a $2^{nd}$ symbol pair, but the remaining one symbol, i.e., a $6^{th}$ SC-FDMA symbol, cannot make any symbol pair. Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected.

Figure 11:
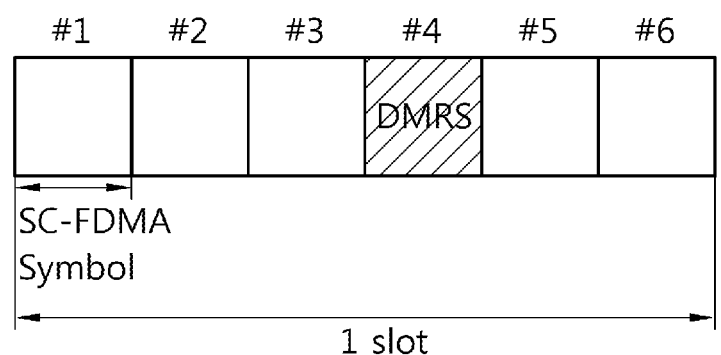
FIG. 11 is a diagram for explaining another example of symbol pairing in a subframe.

FIG. 11 is a diagram for explaining another example of symbol pairing in a subframe.

Referring to FIG. 11, one slot includes 6 SC-FDMA symbols, and a DMRS is transmitted on a $4^{th}$ SC-FDMA symbol. Therefore, $1^{st}$, $2^{nd}$, $3^{rd}$, $5^{th}$, and $6^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows.

TABLE 6

| Index | Symbol Pairing |
|---|---|
| 61 | (2, 3) (5, 6) 1 |
| 62 | (2, 5) (3, 6) 1 |
| 63 | (2, 6) (3, 5) 1 |
| 64 | (1, 3) (5, 6) 2 |
| 65 | (1, 5) (3, 6) 2 |
| 66 | (1, 6) (3, 5) 2 |
| 67 | (1, 2) (5, 6) 3 |
| 68 | (1, 5) (2, 6) 3 |
| 69 | (1, 6) (2, 5) 3 |
| 70 | (1, 2) (3, 6) 5 |
| 71 | (1, 3) (2, 6) 5 |
| 72 | (1, 6) (2, 3) 5 |
| 73 | (1, 2) (3, 5) 6 |
| 74 | (1, 3) (2, 5) 6 |
| 75 | (1, 5) (2, 3) 6 |

Referring to Table 6, symbol pairing of an index 70 is configured such that $1^{st}$ and $2^{nd}$ SC-FDMA symbols make a $1^{st}$ symbol pair, and $3^{rd}$ and $6^{th}$ SC-FDMA symbols make a $2^{nd}$ symbol pair, but the remaining one symbol, i.e., a $5^{th}$ SC-FDMA symbol, cannot make any symbol pair. Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected.

Figure 12:
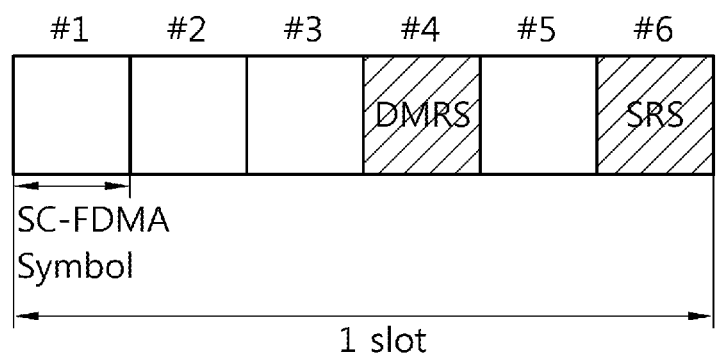
FIG. 12 is a diagram for explaining another example of symbol pairing in a subframe.

FIG. 12 is a diagram for explaining another example of symbol pairing in a subframe.

Referring to FIG. 12, one slot includes 6 SC-FDMA symbols, and a DMRS is transmitted on a $4^{th}$ SC-FDMA symbol. Meanwhile, an SRS is transmitted on a $6^{th}$ SC-FDMA symbol. Therefore, $1^{st}, 2^{nd}, 3^{rd}$, and $5^{th}$ SC-FDMA symbols, i.e., 4 SC-FDMA symbols in total, can be used for data transmission. According to symbol pairing, only two symbol pairs are made. Symbol pairing is not necessarily applied only to contiguous SC-FDMA symbols, and thus various configurations are possible as follows.

TABLE 7

| Index | Symbol Pairing |
|---|---|
| 76 | (1, 2) (3, 5) |
| 77 | (1, 3) (2, 5) |
| 78 | (1, 5) (2, 3) |

Referring to Table 7, symbol pairing of an index 76 is configured such that $1^{st}$ and $2^{nd}$ SC-FDMA symbols make a $1^{st}$ symbol pair, and $3^{rd}$ and $5^{th}$ SC-FDMA symbols make a $2^{nd}$ symbol pair. If the information 1 is transmitted using the first symbol pair and the information 2 is transmitted using the second symbol pair, higher robustness of transmission can be expected.

Figure 13:
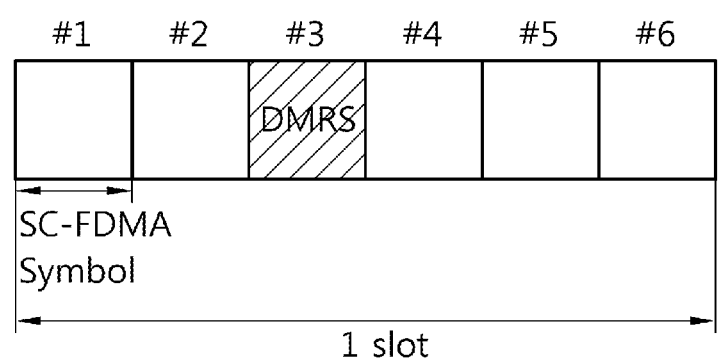
FIG. 13 is a diagram for explaining another example of symbol pairing in a subframe.

FIG. 13 is a diagram for explaining another example of symbol pairing in a subframe.

Referring to FIG. 13, one slot includes 6 SC-FDMA symbols, and a DMRS is transmitted on a $3^{rd}$ SC-FDMA symbol. Therefore, $1^{st}, 2^{nd}, 4^{th}, 5^{th}$, and $6^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows

TABLE 8

| Index | Symbol Pairing |
|---|---|
| 79 | (2, 4) (5, 6) 1 |
| 80 | (2, 5) (4, 6) 1 |
| 81 | (2, 6) (4, 5) 1 |
| 82 | (1, 4) (5, 6) 2 |
| 83 | (1, 5) (4, 6) 2 |
| 84 | (1, 6) (4, 5) 2 |
| 85 | (1, 2) (5, 6) 4 |
| 86 | (1, 5) (2, 6) 4 |
| 87 | (1, 6) (2, 5) 4 |
| 88 | (1, 2) (4, 6) 5 |
| 89 | (1, 4) (2, 6) 5 |
| 90 | (1, 6) (2, 4) 5 |
| 91 | (1, 2) (4, 5) 6 |
| 92 | (1, 4) (2, 5) 6 |
| 93 | (1, 5) (2, 4) 6 |

Referring to Table 8, symbol pairing of an index 90 is configured such that $1^{St}$ and $6^{th}$ SC-FDMA symbols make a $1^{st}$ symbol pair, and $2^{nd}$ and $4^{th}$ SC-FDMA symbols make a $2^{nd}$ symbol pair, but the remaining one symbol, i.e., a $5^{th}$ SC-FDMA symbol, cannot make any symbol pair. Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected.

Figure 14:
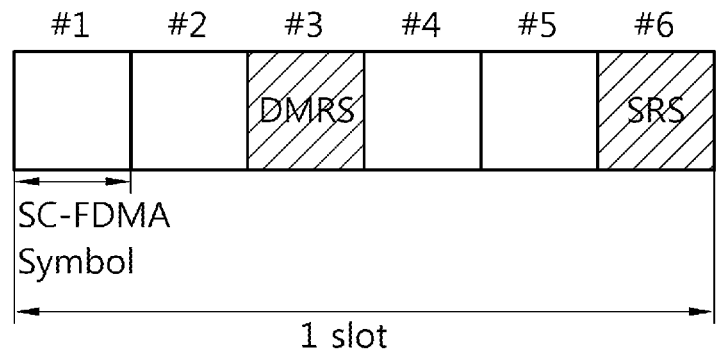
FIG. 14 is a diagram for explaining another example of symbol pairing in a subframe.

FIG. 14 is a diagram for explaining another example of symbol pairing in a subframe.

Referring to FIG. 14, one slot includes 6 SC-FDMA symbols, and a DMRS is transmitted on a $3^{rd}$ SC-FDMA symbol. Meanwhile, an SRS is transmitted on a $6^{th}$ SC-FDMA symbol. Therefore, $1^{st}, 2^{nd}, 4^{th}$, and $5^{th}$ SC-FDMA symbols, i.e., 4 SC-FDMA symbols in total, can be used for data transmission. According to symbol pairing, only two symbol pairs are made. Symbol pairing is not necessarily applied only to contiguous SC-FDMA symbols, and thus various configurations are possible as follows.

TABLE 9

| Index | Symbol Pairing |
|---|---|
| 94 | (1, 2) (4, 5) |
| 95 | (1, 4) (2, 5) |
| 96 | (1, 5) (2, 4) |

Referring to Table 9, symbol pairing of an index 95 is configured such that $1^{st}$ and $4^{th}$ SC-FDMA symbols make a $1^{st}$ symbol pair, and $2^{nd}$ and $5^{th}$ SC-FDMA symbols make a $2^{nd}$ symbol pair. If the information 1 is transmitted using the first symbol pair and the information 2 is transmitted using the second symbol pair, higher robustness of transmission can be expected.

Figure 15:
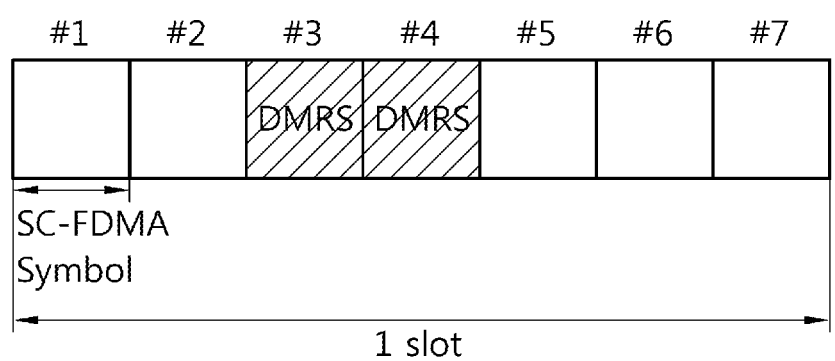
FIG. 15 is a diagram for explaining another example of symbol pairing in a subframe.

FIG. 15 is a diagram for explaining another example of symbol pairing in a subframe.

Referring to FIG. 15, one slot includes 7 SC-FDMA symbols, and a DMRS is transmitted on $3^{rd}$ and $4^{th}$ SC-FDMA symbols. Therefore, $1^{st}, 2^{nd}, 5^{th}, 6^{th}$, and $7^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows.

TABLE 10

| Index | Symbol Pairing |
|---|---|
| 97 | (2, 5) (6, 7) 1 |
| 98 | (2, 6) (5, 7) 1 |
| 99 | (2, 7) (5, 6) 1 |
| 100 | (1, 5) (6, 7) 2 |
| 101 | (1, 6) (5, 7) 2 |
| 102 | (1, 7) (5, 6) 2 |
| 103 | (1, 2) (6, 7) 5 |
| 104 | (1, 6) (2, 7) 5 |
| 105 | (1, 7) (2, 6) 5 |
| 106 | (1, 2) (5, 7) 6 |
| 107 | (1, 5) (2, 7) 6 |
| 108 | (1, 7) (2, 5) 6 |
| 109 | (1, 2) (5, 6) 7 |
| 110 | (1, 5) (2, 6) 7 |
| 111 | (1, 6) (2, 5) 7 |

Referring to Table 10, symbol pairing of an index 100 is configured such that $1^{st}$ and $5^{th}$ SC-FDMA symbols make a $1^{st}$ symbol pair, and $6^{th}$ and $7^{th}$ SC-FDMA symbols make a $2^{nd}$ symbol pair, but the remaining one symbol, i.e., a $2^{nd}$ SC-FDMA symbol, cannot make any symbol pair. Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected.

Figure 16:
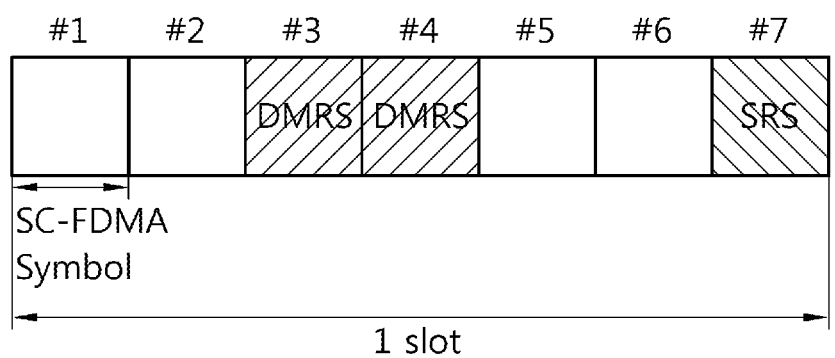
FIG. 16 is a diagram for explaining another example of symbol pairing in a subframe.

FIG. 16 is a diagram for explaining another example of symbol pairing in a subframe.

Referring to FIG. 16, one slot includes 7 SC-FDMA symbols, and a DMRS is transmitted on $3^{rd}$ and $4^{th}$ SC-FDMA symbols. Meanwhile, an SRS is transmitted on a $7^{th}$ SC-FDMA symbol. Therefore, $1^{st}$, $2^{nd}$, $5^{th}$, and $6^{th}$ SC-FDMA symbols, i.e., 4 SC-FDMA symbols in total, can be used for data transmission. According to symbol pairing, only two symbol pairs are made. Symbol pairing is not necessarily applied only to contiguous SC-FDMA symbols, and thus various configurations are possible as follows.

TABLE 11

| Index | Symbol Pairing |
|---|---|
| 112 | (1, 2) (5, 6) |
| 113 | (1, 5) (2, 6) |
| 114 | (1, 6) (2, 5) |

Referring to Table 11, symbol pairing of an index 114 is configured such that $1^{st}$ and $6^{th}$ SC-FDMA symbols make a $1^{st}$ symbol pair, and $2^{nd}$ and $5^{th}$ SC-FDMA symbols make a $2^{nd}$ symbol pair. If the information 1 is transmitted using the first symbol pair and the information 2 is transmitted using the second symbol pair, higher robustness of transmission can be expected.

Figure 17:
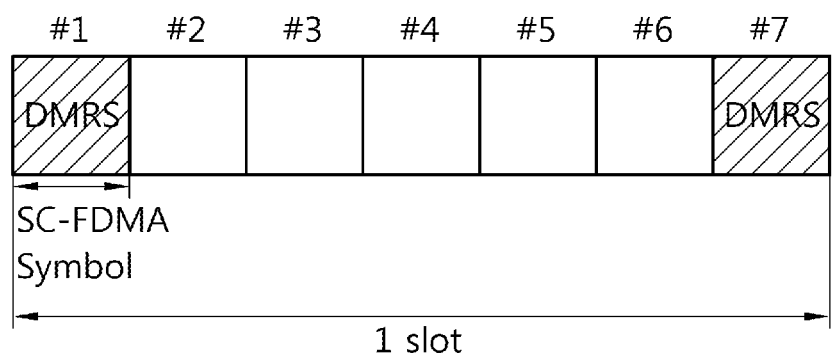
FIG. 17 is a diagram for explaining another example of symbol pairing in a subframe.

FIG. 17 is a diagram for explaining another example of symbol pairing in a subframe.

Referring to FIG. 17, one slot includes 7 SC-FDMA symbols, and a DMRS is transmitted on $1^{st}$ and $7^{th}$ SC-FDMA symbols. Therefore, $2^{nd}$, $3^{rd}$, $4^{th}$, $5^{th}$, and $6^{th}$ SC-FDMA symbols, i.e., 5 SC-FDMA symbols in total, can be used for data transmission. According to symbol pairing, only two symbol pairs are made, and one SC-FDMA symbol cannot make a symbol pair. Therefore, the STBC scheme cannot be applied to one SC-FDMA symbol, and another transmit diversity scheme is selectively applied. Symbol pairing is not necessarily applied only to contiguous SC-FDMA symbols, and thus various configurations are possible as follows.

TABLE 12

| Index | Symbol Pairing |
|---|---|
| 115 | (3, 4) (5, 6) 2 |
| 116 | (3, 5) (4, 6) 2 |
| 117 | (3, 6) (4, 5) 2 |
| 118 | (2, 4) (5, 6) 3 |
| 119 | (2, 5) (4, 6) 3 |
| 120 | (2, 6) (4, 5) 3 |
| 121 | (2, 3) (5, 6) 4 |
| 122 | (2, 5) (3, 6) 4 |
| 123 | (2, 6) (3, 5) 4 |
| 124 | (2, 3) (4, 6) 5 |
| 125 | (2, 4) (3, 6) 5 |
| 126 | (2, 6) (3, 4) 5 |
| 127 | (2, 3) (4, 5) 6 |
| 128 | (2, 4) (3, 5) 6 |
| 129 | (2, 5) (3, 4) 6 |

Referring to Table 12, symbol pairing of an index 120 is configured such that $2^{nd}$ and $6^{th}$ SC-FDMA symbols make a $1^{st}$ symbol pair, and $4^{th}$ and $5^{th}$ SC-FDMA symbols make a $2^{nd}$ symbol pair, but the remaining one symbol, i.e., a $3^{rd}$ SC-FDMA symbol, cannot make any symbol pair. Therefore, the STBC is applied to each of the first and second symbol pairs, but different transmit diversity schemes (e.g., FSTD, PVS, CDD, etc.) are applied to the remaining one SC-FDMA symbol. If the information 1 is transmitted using the first symbol pair and the information 2 is transmitted using the second symbol pair, higher robustness of transmission can be expected.

Figure 18:
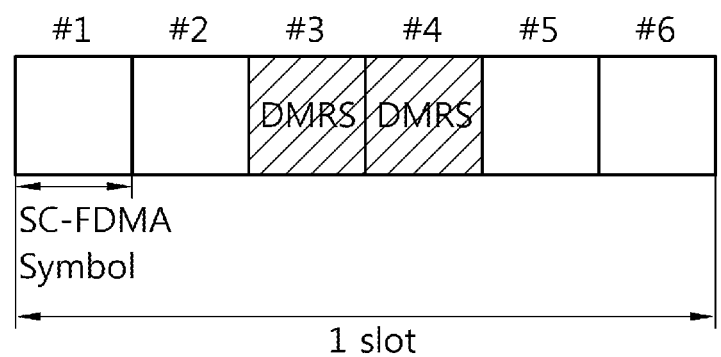
FIG. 18 is a diagram for explaining another example of symbol pairing in a subframe.

FIG. 18 is a diagram for explaining another example of symbol pairing in a subframe.

Referring to FIG. 18, one slot includes 6 SC-FDMA symbols, and a DMRS is transmitted on $3^{rd}$ and $4^{th}$ SC-FDMA symbols. Therefore, $1^{st}$, $2^{nd}$, $5^{th}$, and $6^{th}$ SC-FDMA symbols, i.e., 4 SC-FDMA symbols in total, can be used for data transmission. According to symbol pairing, only two symbol pairs are made. Symbol pairing is not necessarily applied only to contiguous SC-FDMA symbols, and thus various configurations are possible as follows.

TABLE 13

| Index | Symbol Pairing |
|---|---|
| 130 | (1, 2) (5, 6) |
| 131 | (1, 5) (2, 6) |
| 132 | (1, 6) (2, 5) |

Referring to Table 13, symbol pairing of an index 131 is configured such that $1^{st}$ and $5^{th}$ SC-FDMA symbols make a $1^{st}$ symbol pair, and $2^{nd}$ and $6^{th}$ SC-FDMA symbols make a $2^{nd}$ symbol pair. If the information 1 is transmitted using the first symbol pair and the information 2 is transmitted using the second symbol pair, higher robustness of transmission can be expected.

Figure 19:
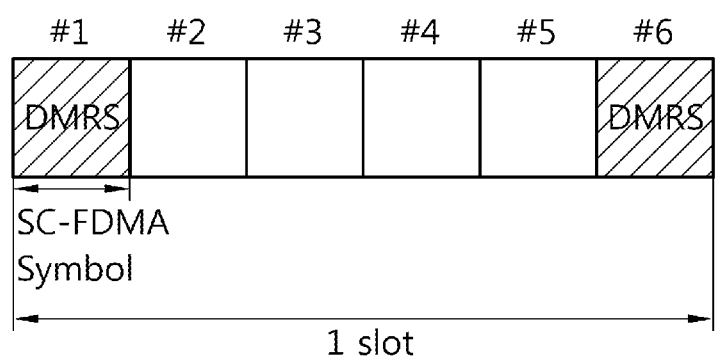
FIG. 19 is a diagram for explaining another example of symbol pairing in a subframe.

FIG. 19 is a diagram for explaining another example of symbol pairing in a subframe.

Referring to FIG. 19, one slot includes 6 SC-FDMA symbols, and a DMRS is transmitted on $1^{st}$ and $6^{th}$ SC-FDMA symbols. Therefore, $2^{nd}$, $3^{rd}$, $4^{th}$, and $5^{th}$ SC-FDMA symbols, i.e., 4 SC-FDMA symbols in total, can be used for data transmission. According to symbol pairing, only two symbol pairs are made. Symbol pairing is not necessarily applied only to contiguous SC-FDMA symbols, and thus various configurations are possible as follows.

TABLE 14

| Index | Symbol Pairing |
|---|---|
| 133 | (2, 3) (4, 5) |
| 134 | (2, 4) (3, 5) |
| 135 | (2, 6) (3, 4) |

Referring to Table 14, symbol pairing of an index 133 is configured such that $2^{nd}$ and $3^{rd}$ SC-FDMA symbols make a 1st symbol pair, and $4^{th}$ and $5^{th}$ SC-FDMA symbols make a $2^{nd}$ symbol pair. If the information 1 is transmitted using the first symbol pair and the information 2 is transmitted using the second symbol pair, higher robustness of transmission can be expected.

Figure 20:
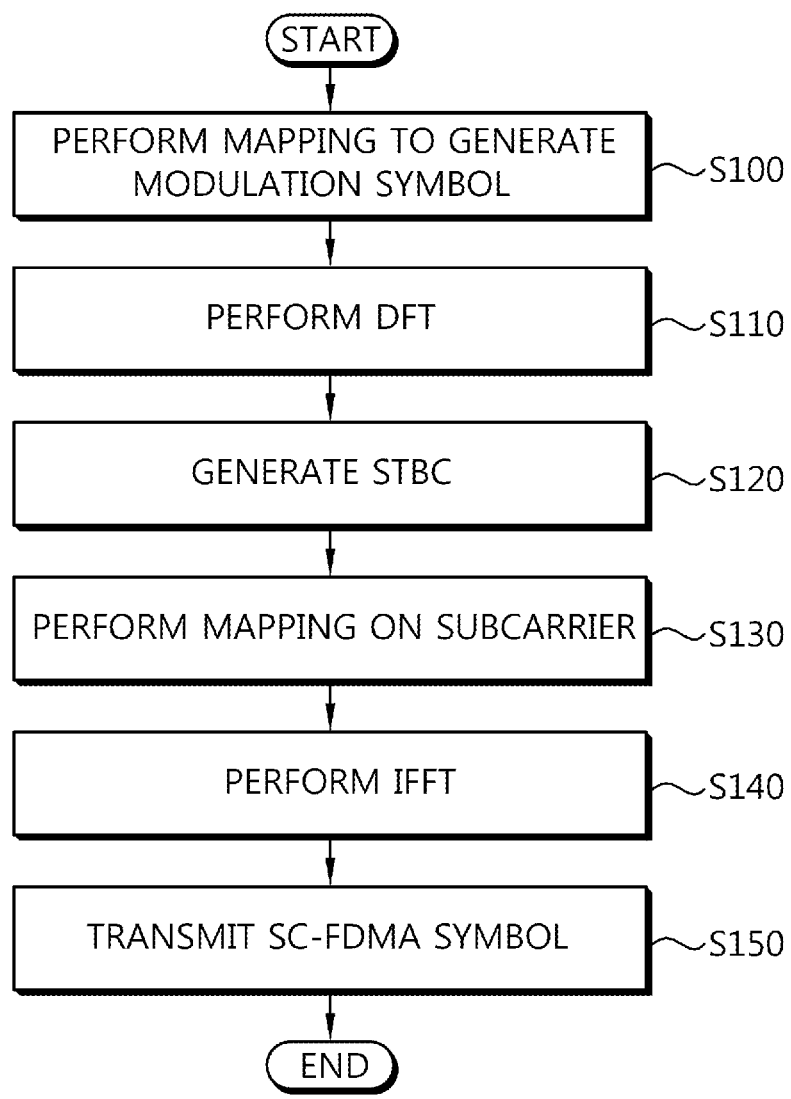
FIG. 20 is a flowchart showing a data transmission method according to an embodiment of the present invention.

FIG. 20 is a flowchart showing a data transmission method according to an embodiment of the present invention.

Referring to FIG. 20, coding and constellation mapping are performed on an information bit to generate a modulation symbol (step S100). Discrete Fourier transform (DFT) is performed on the modulation symbol to generate a frequency-domain symbol (step S110). An STBC scheme is applied to the frequency-domain symbol to generate a STBC (step S120). The STBC is mapped to a subcarrier (step S130), and then inverse fast Fourier transform (IFFT) is performed thereon to generate an SC-FDMA symbol (step S140). The SC-FDMA symbol is transmitted on a slot basis (step S150). Herein, the slot includes a plurality of SC-FDMA symbols, and at least one of the plurality of SC-FDMA symbols is used for transmission of a DMRS which is a reference signal for demodulation of uplink data. Meanwhile, the remaining SC-FDMA symbols are paired to be used for transmission of information coded on the basis of the STBC scheme.

The pair of the SC-FDMA symbols may be configured with contiguous SC-FDMA symbols or may be configured with SC-FDMA symbols spaced apart from each other. At least one of the plurality of SC-FDMA symbols may be used for transmission of a sounding reference signal (SRS) which is a reference signal for measurement of uplink channel quality. Further, the SC-FDMA symbol used in the SRS transmission is located in a last position of the slot. For example, the number of SC-FDMA symbols is 7, and the SC-FDMA symbols used for the DMRS transmission is located in a $4^{th}$ position in the slot. For another example, the number of SC-FDMA symbols is 7, and the SC-FDMA symbol used in the DMRS transmission is located in a $3^{rd}$ position in the slot. For another example, the number of SC-FDMA symbols is 6, and the SC-FDMA symbol used in the DMRS transmission is located in the $3^{rd}$ position in the slot. For another example, the number of SC-FDMA symbols is 6, and the SC-FDMA symbol used in the DMRS transmission is located in the $4^{th}$ position in the slot.

Among the plurality of SC-FDMA symbols, a non-paired SC-FDMA symbol is used for transmission of information coded by using a precoding vector switching (PVS) scheme, a frequency switched transmit diversity (FSTD) scheme, or a cyclic delay diversity (CDD) scheme.

What is claimed is:
1. A data transmission method using a space time block code (STBC) scheme, the method comprising:
generating a modulation symbol by performing coding and constellation mapping on an information bit;
generating a frequency-domain symbol by performing discrete Fourier transform (DFT) on the modulation symbol;
generating a single carrier-frequency division multiple access (SC-FDMA) symbol by performing inverse fast Fourier transform (IFFT) after mapping the frequency-domain symbol to a subcarrier; and
transmitting the SC-FDMA symbol on a slot basis,
wherein the slot consists of seven SC-FDMA symbols, each of the seven SC-FDMA symbols includes a normal cyclic prefix, two of the seven SC-FDMA symbols are used for transmission of demodulation reference signals (DMRSs) as reference signals for demodulation of uplink data, the last SC-FDMA symbol in the slot is a sounding reference signal (SRS) for measurement of uplink channel quality, and the remaining SC-FDMA symbols are paired to be used for transmission of encoded information on the basis of the STBC scheme,
wherein the SC-FDMA symbols used for transmission of the DMRSs are the 3rd and 4th SC-FDMA symbols in the slot,
wherein the 1st and the 6th SC-FDMA symbols are paired in the slot, and the 2nd and the 5th SC-FDMA symbols are paired in the slot.

* * * * *